United States Patent
Shin et al.

(10) Patent No.: US 11,390,238 B2
(45) Date of Patent: Jul. 19, 2022

(54) SEAT-MOUNTED AIRBAG DEVICE

(71) Applicants: Hyundai Motor Company, Seoul (KR); Kia Motors Corporation, Seoul (KR); Hyundai Mobis Co., Ltd., Seoul (KR)

(72) Inventors: Hyo Shub Shin, Seoul (KR); Hyock In Kwon, Seongnam-si (KR); Joo Seon Yoo, Incheon (KR); Choong Ryung Lee, Yongin-si (KR); Sang Won Hwangbo, Yongin-si (KR)

(73) Assignees: Hyundai Motor Company, Seoul (KR); Kia Motors Corporation, Seoul (KR); Hundai Mobis Co., Ltd., Seoul (KR)

( * ) Notice: Subject to any disclaimer, the term of this patent is extended or adjusted under 35 U.S.C. 154(b) by 64 days.

(21) Appl. No.: 16/991,233

(22) Filed: Aug. 12, 2020

(65) Prior Publication Data
US 2021/0170983 A1 Jun. 10, 2021

(30) Foreign Application Priority Data
Dec. 4, 2019 (KR) .......................... 10-2019-0159494

(51) Int. Cl.
*B60R 21/231* (2011.01)
*B60R 21/207* (2006.01)

(52) U.S. Cl.
CPC ...... *B60R 21/23138* (2013.01); *B60R 21/207* (2013.01); *B60R 2021/23146* (2013.01)

(58) Field of Classification Search
CPC ............ B60R 21/207; B60R 21/23138; B60R 21/23184; B60R 2021/23146;
(Continued)

(56) References Cited

U.S. PATENT DOCUMENTS 5,636,862 A * 6/1997 Cheung ................. B60R 21/207
280/730.2
8,360,469 B2 * 1/2013 Wiik ................. B60R 21/23138
280/743.2
(Continued)

FOREIGN PATENT DOCUMENTS

CN 111204304 A * 5/2020 ............. B60N 2/002
CN 112026704 A * 12/2020 ........... B60R 21/231
(Continued)

OTHER PUBLICATIONS

Hyundai Motor Company et al., "Extended European Search Report," Application No. 20191303.5-1132, pp. 1-9 (dated Nov. 16, 2020).

*Primary Examiner* — Karen Beck
(74) *Attorney, Agent, or Firm* — Morgan, Lewis & Bockius LLP

(57) ABSTRACT

A seat-mounted airbag device may include a seatback cushion built in a seatback of a vehicle. The seatback cushion includes side portions configured to be deployed from both side peripheral portions of a seat to a front of the seat to protect sides of an occupant when deployed by gas supplied by an inflator into the seatback cushion. Chest portions of the seatback cushion extend from front ends of the side portions to surround a chest of the occupant to protect the chest of the occupant. The airbag device includes one or more seatback tethers connected to a seat frame and mounted in the seat. When the seatback cushion is deployed, the seatback tethers are deployed along with the seatback cushion to support the chest in a top-bottom direction thereof, thereby supporting an upper body of the occupant.

12 Claims, 7 Drawing Sheets

(58) Field of Classification Search
CPC ........... B60R 2021/23161; B60R 2021/23386; B60R 2021/0048; B60R 21/231; B60R 21/2338; B60R 22/14; B60R 2021/23308; B60N 2/427; B60N 2/4235
See application file for complete search history.

(56) References Cited

U.S. PATENT DOCUMENTS

| | | | | |
|---|---|---|---|---|
| 8,690,187 | B2* | 4/2014 | Fukawatase | B60R 21/207 |
| | | | | 280/730.2 |
| 9,598,042 | B2* | 3/2017 | Schneider | B60R 21/231 |
| 10,486,638 | B2* | 11/2019 | Kwon | B60R 21/23138 |
| 10,543,800 | B2* | 1/2020 | Kwon | B60R 21/2338 |
| 10,543,801 | B2* | 1/2020 | Kwon | B60R 21/233 |
| 10,710,539 | B2* | 7/2020 | Cho | B60R 21/207 |
| 10,870,405 | B2* | 12/2020 | Kwon | B60R 21/23138 |
| 11,021,129 | B2* | 6/2021 | Saito | B60R 21/23138 |
| 2013/0093224 | A1* | 4/2013 | Dainese | B60R 21/207 |
| | | | | 297/216.12 |
| 2014/0062069 | A1* | 3/2014 | Fukawatase | B60R 21/207 |
| | | | | 280/730.2 |
| 2018/0186324 | A1 | 7/2018 | Faruque et al. | |
| 2018/0194317 | A1 | 7/2018 | Barbat et al. | |
| 2019/0016293 | A1* | 1/2019 | Saso | B60R 21/207 |
| 2019/0023214 | A1* | 1/2019 | Kitagawa | B60R 21/01552 |
| 2019/0054890 | A1* | 2/2019 | Kwon | B60R 21/23138 |
| 2019/0061675 | A1* | 2/2019 | Kwon | B60R 21/2338 |
| 2021/0122325 | A1* | 4/2021 | Hwangbo | B60R 21/239 |
| 2021/0146874 | A1* | 5/2021 | Lee | B60R 21/207 |
| 2021/0402949 | A1* | 12/2021 | Sung | B60R 21/23138 |

FOREIGN PATENT DOCUMENTS

| | | | | |
|---|---|---|---|---|
| DE | 102009006688 A1 * | 8/2010 | | B60R 21/2338 |
| DE | 102019103484 A1 * | 8/2019 | | B60R 21/23138 |
| DE | 102020101051 A1 * | 7/2021 | | |
| EP | 1193141 A2 | 9/2001 | | |
| JP | 5999061 B2 | 9/2016 | | |
| JP | 2018-135016 A | 8/2018 | | |
| JP | 2018-161967 A | 10/2018 | | |
| JP | 6432547 B2 | 12/2018 | | |
| JP | 2019-023039 A | 2/2019 | | |
| KR | 10-1940201 B1 | 1/2019 | | |
| KR | 10-2019-0021905 A | 3/2019 | | |
| KR | 10-2019-0087278 A | 7/2019 | | |
| WO | WO-2008038523 A1 * | 4/2008 | | B60R 21/207 |
| WO | WO 2019/198632 A1 | 10/2019 | | |
| WO | WO-2021059766 A1 * | 4/2021 | | |

* cited by examiner

SEAT-MOUNTED AIRBAG DEVICE

CROSS REFERENCE TO RELATED APPLICATION

The present application claims priority to Korean Patent Application No. 10-2019-0159494, filed Dec. 4, 2019, the entire contents of which are incorporated herein for all purposes by this reference.

BACKGROUND OF THE INVENTION

Field of the Invention

The present invention relates to an airbag device for a vehicle, and more particularly, to an airbag device including a seatback cushion surrounding the upper body of a vehicle occupant including the chest, tethers supporting the upper body of the occupant from outside or inside of a cushion, and a seat cushion airbag preventing the submarine phenomenon to safely protect the occupant in an accident.

Description of Related Art

An airbag is a device that protects a vehicle occupant from an impact of a vehicle collision. Such an airbag includes a cushion designed to be instantaneously filled with gas in an accident to protect a vehicle occupant. After being developed in 1950s, the technology of airbags has been improved from first-generation airbags simply having a blow-up function, to second-generation airbags designed to minimize injuries to occupants by reducing the pressure of the deployment of airbags, and to third-generation airbags designed to determine the level of an impact and adjust a pressure before blowing up. At present, fourth-generation airbags having a function of inflating to a suitable level by autonomously determining the position, physique and posture of a vehicle occupant, as well as the intensity of a collision, have been fabricated and commercially distributed.

Furthermore, the development of autonomous vehicles able to autonomously travel without being operated by a driver has been actively undertaken. Along with the age of autonomous vehicles, airbags protecting the safety of vehicle occupants have been modified in a variety of shapes. As driver handling of vehicles, such as operation or braking, has been reduced due to the development of autonomous vehicles, it is expected that consumer demand for safety devices will be further increased.

As vehicles have been evolved from a simple means of transportation to a life space, the arrangement of seats and the posture of riding are expected to change. It is estimated that the shape of airbags will also be changed due to such changes. It is estimated that seats currently oriented in the forward direction may be changed into a variety of free arrangements. For example, seats may be disposed to face each other or may be disposed to be adjustable independently of each other. Accordingly, in consideration of the arrangement of seats of autonomous vehicles, the development of seat deployable airbags able to surround the entire body of a vehicle occupant from both sides of a seat is being undertaken, in place of current types of airbags.

However, airbags that have been developed in the related art are configured to be deployed around the upper body of a vehicle occupant, and thus, the front portion of the upper body of the occupant cannot be protected from an impact, which is problematic. Furthermore, the possibility that the occupant may be injured by the submarine phenomenon occurring in an accident cannot be removed or significantly reduced, which is problematic. Therefore, a solution able to overcome such problems has been demanded.

The foregoing is intended merely to aid in the understanding of the background of the present invention, and is not intended to mean that the present invention falls within the purview of the related art which is already known to those skilled in the art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a seat-mounted airbag device able to be built in a seat to be applicable to autonomous vehicles, to support the entire upper body of a vehicle occupant including the chest, and to prevent the submarine phenomenon by moving the lower body of the occupant upwards.

In various aspects of the present invention, there is provided a seat-mounted airbag device including: a seatback cushion mounted in a seatback of a vehicle, wherein the seatback cushion includes side portions configured to be deployed from both side peripheral portions of a seat to a front of the sear to protect sides of an occupant when deployed by gas supplied by an inflator into the seatback cushion and chest portions extending from front end portions of the side portions to surround a chest of the occupant to protect the chest of the occupant; and one or more seatback tethers connected to a seat frame and mounted in the seat, the seatback tethers being deployed along with the seatback cushion when the seatback cushion is deployed to support the chest in a top-bottom direction thereof, supporting an upper body of the occupant.

The seatback cushion may further include a head portion extending upwards from the side portions to surround the head of the occupant and portions of the occupant adjacent to the head when deployed.

Downwardly-open areas may be provided between the side portions and the chest portions of the seatback cushion, and the chest portions may be connected to portions of the side portions located above the open areas to have a shape of a vest of the occupant, such that arms of the occupant are exposed externally through the open areas.

The chest portions of the seatback cushion may protrude from the side portions toward each other to surround the chest of the occupant.

Each of the seatback tethers may be built in the seat, with one end portion being connected to a center portion of the head portion and the other end portion being connected to a side frame of the seatback. When the seatback cushion is deployed, the seatback tethers may be deployed along with the seatback cushion to surround an outside of the chest along an outside of the head, supporting the upper body of the occupant.

The seatback cushion may be deployed from both the side portions of the seatback toward opposite sides so that at least portions thereof are connected while surrounding a head and the upper body of the occupant.

The airbag device may be built in a seat cushion of the vehicle, and when deployed by the gas supplied by the inflator, may move a lower body of the occupant upwards to prevent a submarine phenomenon.

Each of the seatback tethers may be built in the seat, with one end portion being connected to a front of a seat cushion airbag and the other end portion being connected to a top end portion of the seatback. When the seat cushion airbag is deployed, the seatback tethers may be deployed together with the seat cushion airbag to support the upper body of the occupant from outside of the seatback cushion and move the seat cushion airbag upwards to support the lower body of the occupant.

The seat-mounted airbag device may further include a seat cushion tether built in the seat, wherein, when the seat cushion airbag is deployed, the seat cushion tether is deployed along with the seat cushion airbag to support the lower body of the occupant.

Both end portions of the seat cushion tether may be connected to both sides of a mounting portion of the seat cushion airbag, the seat cushion tether is provided around the seat frame to be built in the seat. When the seatback cushion and the seat cushion airbag are deployed, the seat cushion tether may be deployed along with the seatback cushion and the seat cushion airbag to surround both sides and a top portion of the seatback cushion and a bottom portion of the seat cushion airbag.

The seatback tethers may include a pair of seatback tethers, each of which is provided on a corresponding one of both sides of the seat and is built in the seatback, with one end portion being connected to a top end portion of the seatback frame and the other end portion being connected to a bottom end portion of the seatback frame. When the seatback cushion is deployed, the seatback tethers may be deployed along with the seatback cushion to support the upper body of the occupant from outside the seatback cushion.

The seatback tethers may include a pair of seatback tethers, each of which is provided on a corresponding one of both sides of the seat and is built in the seat, with one end portion being connected to a center portion of a top end portion of the seatback frame and the other end portion being connected to a bottom end portion of the seatback frame along a rear portion of a headrest frame. When the seatback cushion is deployed, the seatback tethers may be deployed along with the seatback cushion to support the upper body of the occupant from outside the seatback cushion.

The seatback tethers may include a pair of seatback tethers, each of which is provided on a corresponding one of both sides of the seat and is built in the seat, with one end portion being connected to a top end portion of a seatback frame and the other end portion being connected to a side frame of a seat cushion. When the seatback cushion is deployed, the seatback tethers may be deployed along with the seatback cushion to support the upper body of the occupant from outside the seatback cushion.

The seatback tethers may include a pair of seatback tethers, each of which is provided on a corresponding one of both sides of the seat and is built in the seat, with one end portion being connected to a side of a top end portion of a seatback frame and the other end portion being connected to a bottom end portion of the seatback frame in an opposite side thereof. When the seatback cushion is deployed, the seatback tethers may be deployed along with the seatback cushion to cross each other outside the seatback cushion to support the upper body of the occupant.

The seatback tethers may include a pair of seatback tethers, each of which is provided on a corresponding one of both sides of the seat and is built in the seat, with one end portion being connected to a side of a top end portion of a seatback frame and the other end portion being connected to the seatback cushion. When the seatback cushion is deployed, the seatback tethers may be deployed along with the seatback cushion to support the upper body of the occupant from inside the seatback cushion.

The seatback cushion may have through-holes allowing portions of the seatback tethers to pass therethrough to impart tension to the seatback tethers, increasing supporting force.

According to an exemplary embodiment of the present invention, the seat-mounted airbag device may be built in a seat to be applied irrespective of the arrangement of seats, and may be applied to autonomous vehicles to be advantageously used as a next-generation airbag device.

Furthermore, when the seat cushion is deployed, the entire upper body of a vehicle occupant, including the head, shoulders, and chest, may be protected. When the seat cushion airbag is deployed, the lower body of the occupant may be moved upwards, preventing the submarine phenomenon.

Since the upper body and the lower body of the occupant are supported by the seatback tether and the seat cushion tether, the occupant may be safely protected by the airbag, preventing the body of the occupant from being injured.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objectives, features, and other advantages of the present invention

Figure 1:
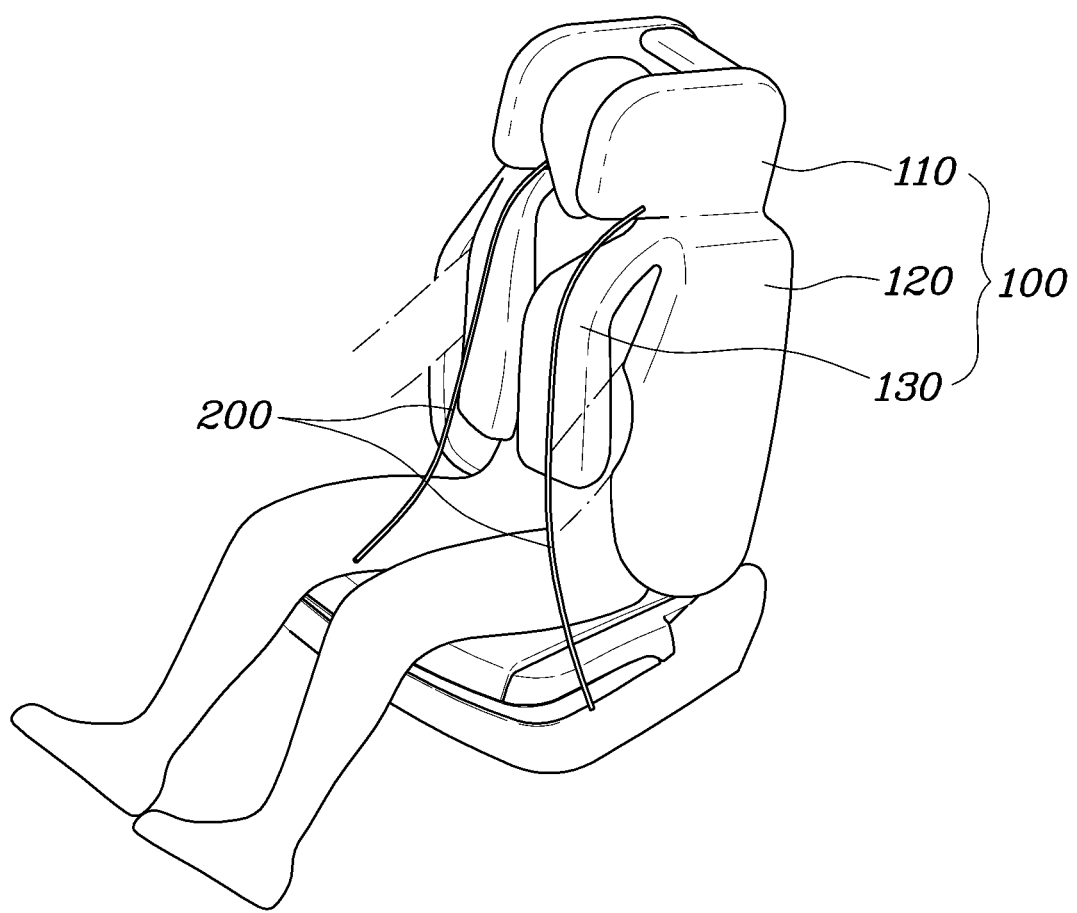
FIG. 1 is a perspective view exemplarily illustrating a seat-mounted airbag device according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of embodiments of the present invention disclosed herein are only for illustrative purposes of the exemplary embodiments of the present invention. The present invention may be embodied in various forms without departing from the spirit and significant characteristics of the present invention. Therefore, the exemplary embodiments of the present invention are disclosed only for illustrative purposes and should not be construed as limiting the present invention.

The terminology used herein is for the purpose of describing various exemplary embodiments only and is not intended to be limiting. As used herein, the singular forms "a," "an", and "the" are intended to include the plural forms as well, unless the context clearly indicates otherwise. It will be further understood that the terms "comprise", "include", "have", etc. When used in the exemplary embodiment, specify the presence of stated features, integers, steps, operations, elements, components, or combinations of thereof do not preclude the presence or addition of one or more other features, integers, steps, operations, elements, components, or combinations thereof.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present invention, and will not be interpreted in an idealized or overly formal sense unless expressly so defined herein.

Hereinbelow, various exemplary embodiments of the present invention will be described in detail with reference to the accompanying drawings. Throughout the drawings, the same reference numerals will refer to the same or like parts.

The present invention relates to a seat-mounted airbag device. With changes in the design and the paradigm of space utilization regarding the internal space of vehicles, the ability of a side airbag to protect a side of the upper body of a vehicle occupant is further restricted in a case in which such the side airbag is built in a vehicle body. Furthermore, since vehicle seats may be disposed in a variety of manners in a response to the development of autonomous vehicles, the ability of vehicle mounted airbags for protecting vehicle occupants may be insufficient. In this regard, the airbag device according to an exemplary embodiment of the present invention may be built in a seat, i.e., be mounted internal to the seat. The seat-mounted airbag device according to an exemplary embodiment of the present invention, i.e., the airbag device built in a seat according to an exemplary embodiment of the present invention, may be configured to surround the entire upper body of a vehicle occupant, including side portions of the shoulders and the front portion of the chest, protecting the occupant from an accident.

FIG. 1 is a perspective view exemplarily illustrating a seat-mounted airbag device according to an exemplary embodiment of the present invention.

Referring to FIG. 1, the seat-mounted airbag device according to an exemplary embodiment of the present invention may include a seatback cushion 100 and seatback tethers 200. Furthermore, the seat-mounted airbag device may further include a seat cushion airbag 300 and seat cushion tethers 400.

In an accident, the seatback cushion 100 rapidly inflates around the body of a vehicle occupant, serving to protect the body of the occupant. In the seat-mounted airbag device according to an exemplary embodiment of the present invention, the seatback cushion 100 may be built in a seatback of the vehicle. The seatback cushion 100 may be coupled to side portions of a seatback frame, together with the tethers. The airbag device may be mounted on the seat frame using a mounting bracket.

The seatback cushion 100 may include side portions 120, chest portions 130, and a head portion 110. When an impact is detected by an impact sensor, an inflator, a gas generator, supplies gas to the seatback cushion 100, under the control of an electronic control unit (ECU), so that the seatback cushion 100 is deployed.

The side portions 120 may be deployed from both side peripheral portions of the seat to the front in which the occupant is located to protect both the side portions 120 of the upper body of the occupant, including both arms and both shoulders. This may reduce the impact applied to the side portions of the upper body of the occupant, protecting the side portions of the upper body of the occupant in the accident.

The chest portions 130 may be configured to be deployed from the front end portions of the side portions 120 to the front to surround the upper body of the occupant. The chest portions 130 may be configured to surround the entire front portion of the upper body of the occupant to reduce the impact applied to the front portion of the upper body of the occupant, protecting the front portion of the upper body of the occupant.

The head portion 110 may be configured to extend upwards from the side portions 120 to surround the head of the occupant and portions adjacent to the head. Since the head portion 110 surrounds the head and the adjacent portions, the impact applied to the head may be reduced, so that the head of the occupant may be protected.

The seatback tethers 200 may support the seatback cushion 100 from outside or inside of the seatback cushion 100 that has been deployed by gas supplied thereto by the inflator. The seatback tethers 200 may be located internal to an airbag module cover together with the seatback cushion 100, and may be coupled to the tethers in portion by sewing or the like.

When the seatback cushion 100 is deployed, the seatback tethers 200 built in the seatback cushion 100 may be deployed together with seatback cushion 100 to support the chest portions 130 in the top-bottom direction thereof. This may support and prevent the upper body of the occupant from moving excessively, so that the upper body of the occupant may be protected by the seatback cushion 100. The seatback tethers 200 may be connected to the seat in a variety of forms and may be deployed variously depending on the forms, and details thereof will be described later with reference to the drawings.

The seatback tethers 200 may be coupled to the surfaces of inactive zones of the seatback cushion 100, or may be coupled to the seatback cushion 100 by sewing, Velcro tape, or the like. Alternatively, the seatback cushion 100 may have through-holes allowing portions of the seatback tethers 200 to pass therethrough, so that the seatback tethers 200 may have strong tension. The seatback tethers 200 may extend through the through-holes to be connected to the seatback cushion 100, obtaining supporting or holding force.

Referring to FIG. 1, in the seat-mounted airbag device according to an exemplary embodiment of the present invention, downwardly-open areas are provided between the side portions 120 and the chest portions 130 of the seatback cushion 100. The chest portions 130 may be connected to portions of the side portions 120 located above the open areas to have the shape of a vest. When the seatback cushion 100 is deployed, the chest portions 130 may surround the upper body of the occupant, with the arms of the occupant being exposed externally through the open areas, so that the occupant may be safely protected.

Figure 2:
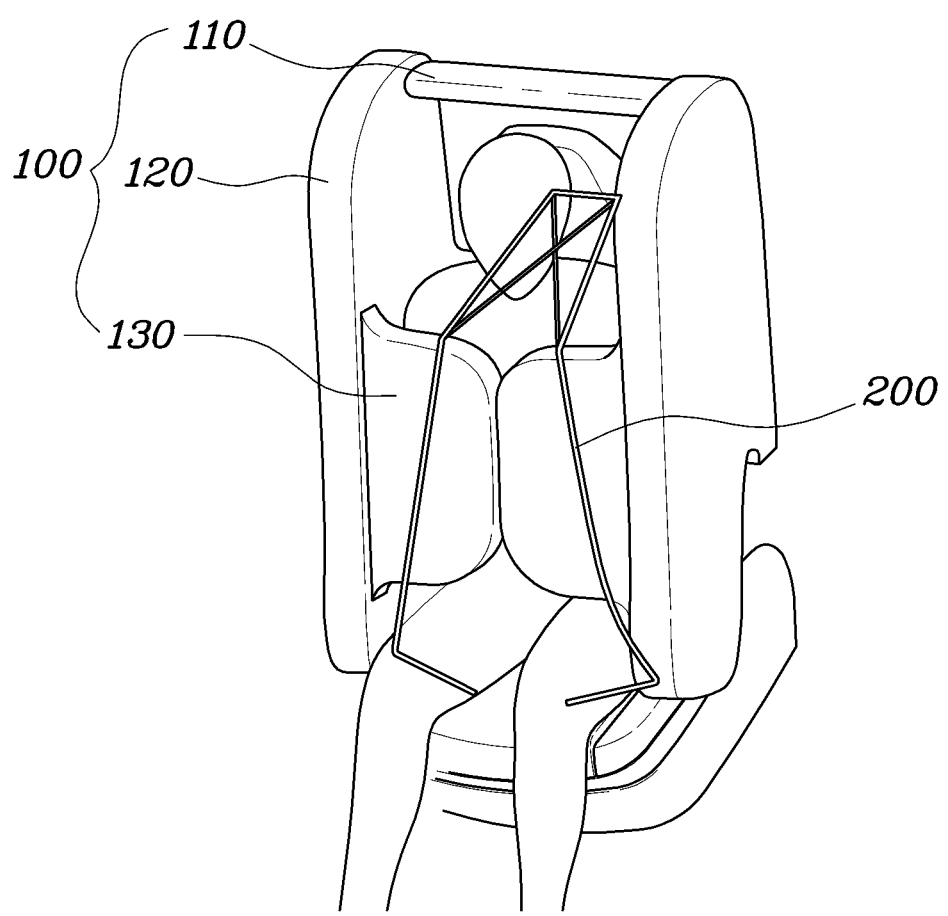
FIG. 2 is a perspective view exemplarily illustrating a seat-mounted airbag device according to various exemplary embodiments of the present invention.

FIG. 2 is a perspective view exemplarily illustrating a seat-mounted airbag device according to various exemplary embodiments of the present invention.

Referring to FIG. 2, in the seat-mounted airbag device according to various exemplary embodiments of the present invention, the side portions 120 of the seatback cushion 100 protrude forward from both sides of the occupant to surround the shoulders and the arms of the occupant. The chest portions 130 may be provided on the side portions 120, respectively, to protrude in directions in which the side portions 120 face each other. A coupling means, such as Velcro tape or magnets, may be provided on surfaces in which the chest portions 130 join each other to prevent the occupant from being exposed externally by strong impact. Since the front portion of the upper body of the occupant may be protected by the chest portions 130, there is an effect that the occupant may be protected excellently in an accident.

Furthermore, when the seatback cushion 100 is deployed, the seatback cushion 100 may extend from both side portions of the seatback to be deployed toward opposite sides to surround both the head and upper body of the occupant. In the instant case, the portions of the seatback cushion 100 deployed toward the opposite sides may be connected at least partially to each other. In the case of the seatback cushion 100 having the present configuration, the integral structure of the seatback cushion 100 may protect the upper body of the occupant, including the head, the chest, the shoulders, and the arms.

FIG. 3, FIG. 4, FIG. 5 and FIG. 6 illustrate a connected shape and a deployed shape of the seatback tethers 200 in the seat-mounted airbag device according to an exemplary embodiment of the present invention. In FIG. 3, FIG. 4, FIG. 5 and FIG. 6, a dotted line indicates a shape of the seatback tethers 200 packed before being deployed, while a solid line indicates a shape of the seatback tethers 200 deployed to support the seatback cushion 100.

Figure 3:
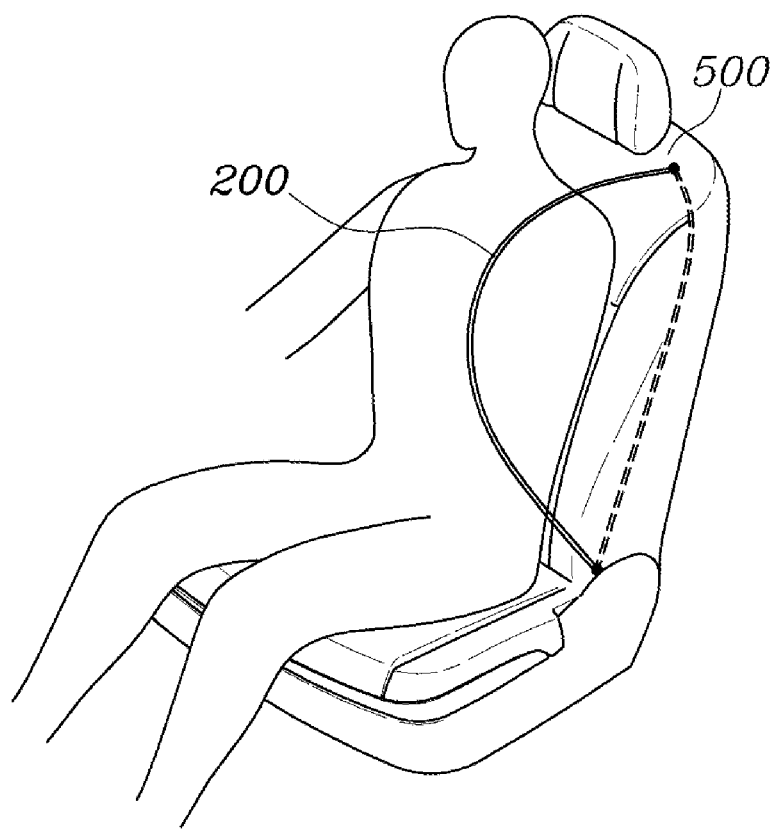
FIG. 3, FIG. 4, FIG. 5 and FIG. 6 illustrate a connected shape and a deployed shape of the seatback tethers in the seat-mounted airbag device according to an exemplary embodiment of the present invention.

Referring to FIG. 3, a pair of seatback tethers 200 may be provided such that one seatback tether 200 is disposed on either side of the seat. Each of the seatback tethers 200 may be built in the seatback, with one end portion being connected to top end portion of the seatback frame 500, and the other end portion being connected to the bottom end portion of the seatback frame. When the seatback cushion 100 is deployed, the seatback tethers 200 may be deployed along with the seatback cushion 100 to support the upper body of the occupant from outside of the seatback cushion 100. In the instant case, the seatback tethers 200 are connected to portions of the seatback frame 500 behind positions at which the shoulders of the occupant are located, so that the packaging of the tether and the seatback cushion 100 may be advantageously facilitated.

Figure 4:
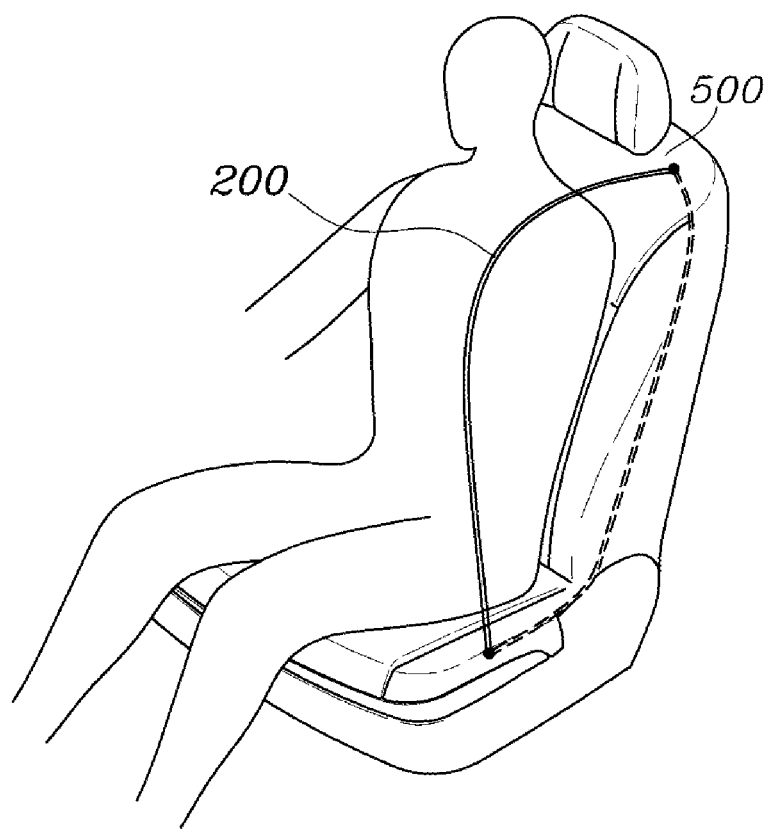

Alternatively, as illustrated in FIG. 4, each of the seatback tethers 200 may be built in the seatback, with one end portion being connected to top end portion of the seatback frame and the other end portion being connected to the side frame of the seat cushion.

In the case of the seatback tethers 200 illustrated in FIG. 3 and FIG. 4, the pair of seatback tethers 200 may fix the seatback cushion 100 at the positions of both the shoulders of the occupant to prevent the upper body of the occupant from excessively moving or being released from the seatback cushion 100, supporting the upper body of the occupant.

Figure 5:
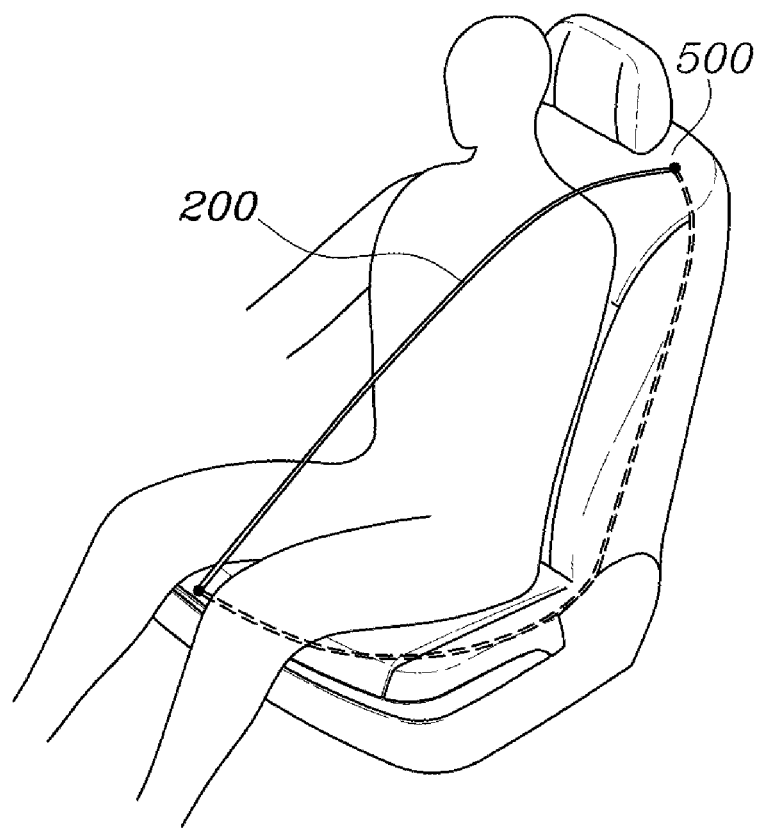

Referring to FIG. 5, the pair of seatback tethers 200 may be provided such that one seatback tether 200 is disposed on either side of the seat. Each of the seatback tethers 200 may be built in the seatback, with one end portion being connected to the side of top end portion of the seatback frame and the other end portion being connected to the bottom end portion of the seatback frame in the opposite side thereof. When the seatback cushion 100 is deployed, the seatback tethers 200 may be deployed outside of the seatback cushion 100, along with the seatback cushion 100, to cross each other in the shape of a letter "X" or "V". The seatback tethers of the pair of seatback tethers 200 may be configured to cross each other, supporting and protecting the upper body of the occupant.

Figure 6:
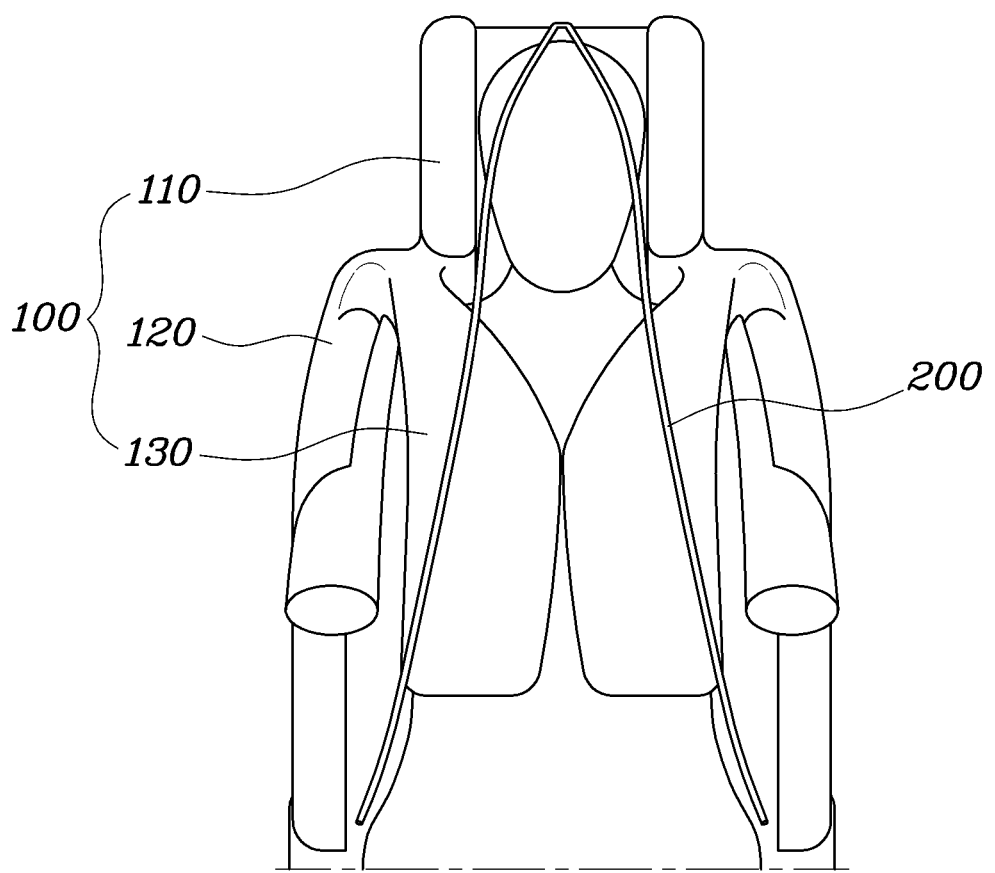

Referring to FIG. 6, the seatback tethers 200 may be provided as a plurality of seatback tethers 200, each of which has one end portion connected to the center portion of the head portion 110 and the other end portion connected to the side frame of the seatback. The seatback tethers 200 may be configured to surround the outside of the chest portions 130 along the external portions of the head portion 110, supporting the upper body of the occupant, when the seatback cushion 100 is deployed.

Since the seatback tethers 200 are deployed at a high speed, there is a danger that the seatback tethers 200 may be caught by the neck or a shirt of the occupant while being deployed. However, the seatback tethers 200 are configured to surround the outside of the chest portions 130 at the center portion of the head portion 110, so that the possibility that the tethers may interfere with the neck or the shirt of the occupant may be advantageously lowered.

Furthermore, although not shown in the drawings, a plurality of seatback tethers 200 may be provided on both sides of the seat, respectively. Each of the seatback tethers 200 may be built in the seat, with one end portion being connected to the center portion of top end portion of the seatback frame and the other end portion being connected to the bottom end portion of the seatback frame along the rear portion of a headrest frame. When the seatback cushion 100 is deployed, the seatback tethers 200 may be deployed along with the seatback cushion 100 to support the upper body of the occupant from outside of the seatback cushion 100. In the instant case, the seatback tethers 200 are deployed along the rear portion of the headrest frame to be in front of the seatback cushion 100. Advantageously, the possibility that the tethers may interfere with the neck or the shirt of the occupant may be lowered, and the upper body of the occupant may be reliably supported.

Figure 7:
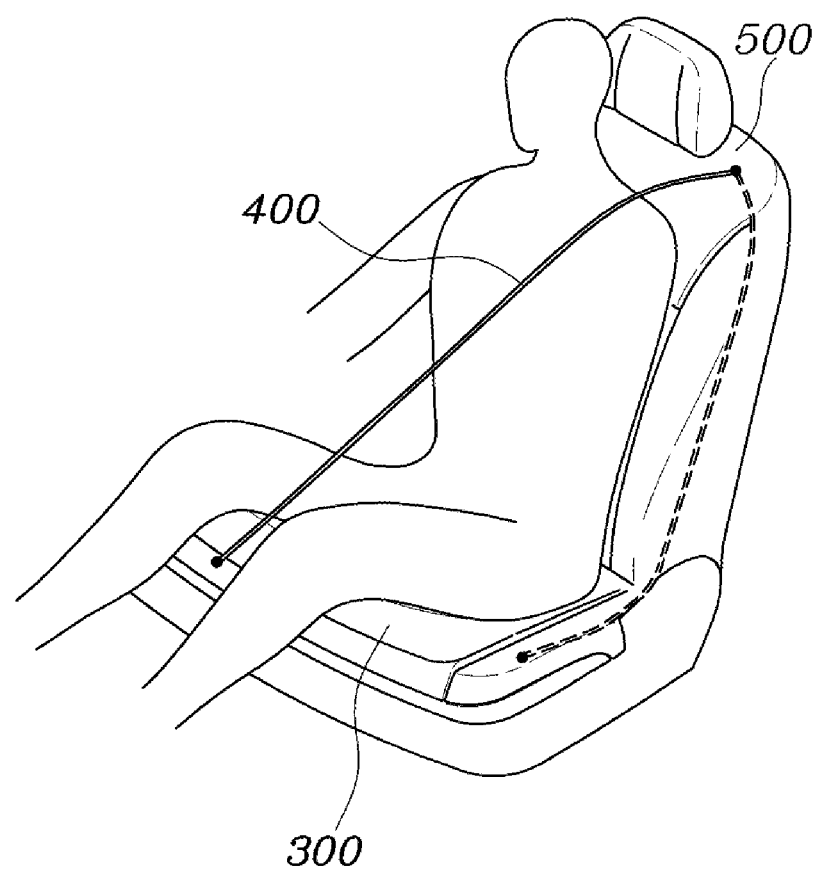
FIG. 7 illustrates a situation in which the seat cushion airbag and the seat cushion tether are connected in the seat-mounted airbag device according to an exemplary embodiment of the present invention.

FIG. 7 illustrates a situation in which the seat cushion airbag 300 and the seat cushion tether 400 are connected in the seat-mounted airbag device according to an exemplary embodiment of the present invention.

The seat cushion airbag 300 is an airbag built in the seat cushion to move the lower body of the occupant upwards to prevent the submarine phenomenon in an accident.

Referring to FIG. 7, each of the seatback tethers 200 may be built in the seat, with one end portion being connected to the front portion of the seat cushion airbag 300 and the other end portion being connected to the top end portion of the seat bag. When the seatback cushion 100 is deployed, the seatback tethers 200 may be deployed along with the seatback cushion 100 to support the upper body of the occupant at the front of the seatback cushion 100 and to move the seat cushion airbag 300 upwards to support the lower body of the occupant.

Furthermore, a seat cushion tether 400 supporting the seat cushion airbag 300 by tension may further be provided. The seat cushion tether 400 may be built in the seat, and when the seat cushion airbag 300 is deployed, may be deployed along with the seat cushion airbag 300 to support the lower body of the occupant.

Furthermore, the seat cushion tether 400 may be configured to surround both the seatback cushion 100 and the seat cushion airbag 300. The seat cushion tether 400 may be built in the seat, such that both end portions thereof are connected to both sides of the mounting portion of the seat cushion airbag 300, and the seat cushion tether 400 is provided around the seat frame. When the seatback cushion 100 and the seat cushion airbag 300 are deployed, the seat cushion tether 400 may be deployed along with the seatback cushion 100 and the seat cushion airbag 300 to surround both the sides and the top portion of the seatback cushion 100 while extending along the bottom portion of the seat cushion airbag 300. In the instant case, the seat cushion tether 400 may advantageously support both the lower body and the upper body of the occupant by pressing the sides of the seatback cushion 100 while moving the seat cushion airbag 300 upwards.

The airbag device having a variety of configurations according to an exemplary embodiment of the present invention may be built in the seat to be applied to autonomous vehicles. Furthermore, the airbag device may support the entire upper body of the occupant, and may advantageously prevent the submarine phenomenon by moving the lower body upwards.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An airbag device comprising:
   a seatback cushion mounted in a seatback of a vehicle, wherein the seatback cushion includes:
      side portions configured to be deployed from first and second peripheral portions of a seat to a front of the seat to protect sides of an occupant when deployed by gas supplied by an inflator into the seatback cushion; and
      chest portions extending from front end portions of the side portions to surround a chest of the occupant to protect the chest of the occupant when deployed by the gas supplied by the inflator into the seatback cushion; and
   at least a seatback tether connected to a seat frame and mounted in the seat, the at least a seatback tether being deployed along with the seatback cushion when the seatback cushion is deployed to support the chest in a top-bottom direction thereof, supporting an upper body of the occupant,
   wherein the seatback cushion further includes a head portion extending upwards from the side portions to surround a head of the occupant and portions of the occupant adjacent to the head when deployed, and
   wherein each of the at least a seatback tether is mounted in the seat, with a first end portion thereof being connected to a center portion of the head portion and a second end portion being connected to a side frame of the seatback, and when the seatback cushion is deployed, is deployed along with the seatback cushion to surround an outside of the chest along an outside of the head, supporting the upper body of the occupant.

2. The airbag device according to claim 1, wherein downwardly-open areas are provided between the side portions and the chest portions of the seatback cushion, and the chest portions are connected to portions of the side portions located above the downwardly-open areas to have a shape of a vest of the occupant.

3. The airbag device according to claim 1, wherein the chest portions of the seatback cushion are configured to protrude from the side portions toward each other to surround the chest of the occupant.

4. The airbag device according to claim 1, wherein the seatback cushion is deployed from the side portions of the seatback toward a first opposite side and a second opposite side so that at least a portion thereof is connected while surrounding the head and the upper body of the occupant.

5. An airbag device comprising:
   a seatback cushion mounted in a seatback of a vehicle, wherein the seatback cushion includes:
      side portions configured to be deployed from first and second peripheral portions of a seat to a front of the seat to protect sides of an occupant when deployed by gas supplied by an inflator into the seatback cushion; and
      chest portions extending from front end portions of the side portions to surround a chest of the occupant to protect the chest of the occupant when deployed by the gas supplied by the inflator into the seatback cushion; and
   at least a seatback tether connected to a seat frame and mounted in the seat, the at least a seatback tether being deployed along with the seatback cushion when the seatback cushion is deployed to support the chest in a top-bottom direction thereof, supporting an upper body of the occupant,
   wherein the airbag device is mounted in a seat cushion of the vehicle, and when deployed by the gas supplied by the inflator to the airbag device, moves a lower body of the occupant upwards to prevent a submarine phenomenon, and wherein each of the at least a seatback tether is mounted in the seat, with a first end portion thereof being connected to a front of a seat cushion airbag and a second end portion being connected to a top end portion of the seatback, and when the seat cushion airbag is deployed, the at least a seatback tether is deployed with the seat cushion airbag to support the upper body of the occupant from outside of the seatback cushion and move the seat cushion airbag upwards to support the lower body of the occupant.

6. The airbag device according to claim 5, further including a seat cushion tether mounted in the seat, wherein, when the seat cushion airbag is deployed, the seat cushion tether is deployed along with the seat cushion airbag to support the lower body of the occupant.

7. The airbag device according to claim 6, wherein a first end portion and a second end portion of the seat cushion tether are connected to a first side and a second side of a mounting portion of the seat cushion airbag, the seat cushion tether is mounted around the seat frame to be mounted in the seat, and when the seatback cushion and the seat cushion airbag are deployed, the seat cushion tether is deployed along with the seatback cushion and the seat cushion airbag to surround first and second sides and a top portion of the seatback cushion and a bottom portion of the seat cushion airbag.

8. The airbag device according to claim 1, wherein the at least a seatback tether includes a pair of seatback tethers, each of which is provided on a corresponding one of first and second sides of the seat and is mounted in the seatback, with a first end portion thereof being connected to a top end portion of a seatback frame and a second end portion being connected to a bottom end portion of the seatback frame, wherein, when the seatback cushion is deployed, the at least a seatback tether is deployed along with the seatback cushion to support the upper body of the occupant from outside the seatback cushion.

9. The airbag device according to claim 1, wherein the at least a seatback tether includes a pair of seatback tethers, each of which is provided on a corresponding one of first and second sides of the seat and is mounted in the seat, with a first end portion thereof being connected to a top end portion of a seatback frame and a second end portion being connected to a side frame of a seat cushion, and when the seatback cushion is deployed, the at least a seatback tether is deployed along with the seatback cushion to support the upper body of the occupant from outside the seatback cushion.

10. An airbag device comprising:

a seatback cushion mounted in a seatback of a vehicle, wherein the seatback cushion includes:

side portions configured to be deployed from first and second peripheral portions of a seat to a front of the seat to protect sides of an occupant when deployed by gas supplied by an inflator into the seatback cushion; and chest portions extending from front end portions of the side portions to surround a chest of the occupant to protect the chest of the occupant when deployed by the gas supplied by the inflator into the seatback cushion; and at least a seatback tether connected to a seat frame and mounted in the seat, the at least a seatback tether being deployed along with the seatback cushion when the seatback cushion is deployed to support the chest in a top-bottom direction thereof, supporting an upper body of the occupant, wherein the at least a seatback tether includes a pair of seatback tethers, each of which is provided on a corresponding one of first and second sides of the seat and is mounted in the seat, with a first end portion thereof being connected to a side of a top end portion of a seatback frame and a second end portion being connected to a bottom end portion of the seatback frame in an opposite side thereof, and when the seatback cushion is deployed, the at least a seatback tether is deployed along with the seatback cushion to cross each other outside the seatback cushion to support the upper body of the occupant.

11. The airbag device according to claim 1, wherein the at least a seatback tether includes a pair of seatback tethers, each of which is provided on a corresponding one of first and second sides of the seat and is mounted in the seat, with a first end portion thereof being connected to a side of a top end portion of a seatback frame and a second end portion being connected to the seatback cushion, and when the seatback cushion is deployed, the at least a seatback tether is deployed along with the seatback cushion to support the upper body of the occupant from inside the seatback cushion.

12. The airbag device according to claim 1, wherein the seatback cushion has through-holes allowing portions of the at least a seatback tether to pass therethrough to impart tension to the at least a seatback tether, increasing supporting force.

* * * * *